Oct. 20, 1964   C. B. METZADOUR   3,153,748
CONTROL APPARATUS

Filed July 17, 1962   3 Sheets-Sheet 2

CARLOS B. METZADOUR
INVENTOR.

BY
Rudolph J. Lurich
ATTORNEY

Oct. 20, 1964 C. B. METZADOUR 3,153,748
CONTROL APPARATUS

Filed July 17, 1962 3 Sheets-Sheet 3

CARLOS B. METZADOUR
INVENTOR.

BY
ATTORNEY 3,153,748
Patented Oct. 20, 1964

3,153,748
CONTROL APPARATUS
Carlos B. Metzadour, Fort Lee, N.J., assignor to Thermo Electric Co., Inc., Saddle Brook, N.J., a corporation of New Jersey
Filed July 17, 1962, Ser. No. 210,471
20 Claims. (Cl. 317—148.5)

This invention relates to a control apparatus for use in maintaining a variable condition at a preselected level and more particularly to control apparatus responsive to an input signal, which varies in magnitude in correspondence with deviations of a condition from a preselected level or state, thereby to effect an appropriate control action.

Apparatus made in accordance with this invention is adaptable for use in any system wherein deviations in a condition, from a preselected norm, produce corresponding changes in an electrical voltage or current thereby to effect a condition of system unbalance, and wherein power means are provided for effecting an appropriate corrective action on the condition thereby to return the system to a balanced condition. However, the apparatus will be described, hereinbelow, with specific reference to a temperature controller.

In temperature controllers, manually settable means are provided for maintaining the temperature of a furnace at a preselected level. The actual furnace temperature is measured by a thermocouple and deviations of the furnace temperature from the preselected level results in an appropriate change in the electrical energy supplied to the furnace. The thermocouple develops a D.-C. electrical potential having a magnitude which varies with the temperature difference between the hot and cold ends thereof. Generally, the thermocouple potential is converted into a corresponding alternating potential by means of a vibrator whereby conventional A.C. amplifiers can be used to effect a rebalancing of the control system and to operate power apparatus for the control of the electrical energy supplied to the furnace. Magnetic amplifiers have also been utilized in temperature controllers but such apparatus has a limited sensitivity and accuracy, and a relatively long response characteristic.

A temperature controller made in accordance with this invention is a completely solid state device utilizing a magnetic circuit of novel construction, thereby eliminating all moving parts. The apparatus is of small size, can be made to have a sensitivity of ±½° F., or better, with an iron-constantan thermocouple up to 2,000° F., and has an overall operating accuracy of ±1%.

An object of this invention is the provision of a control apparatus utilizing solid state components thereby promoting long, trouble-free operation.

An object of this invention is the provision of control apparatus for use in maintaining a variable condition at a preselected level, which apparatus operates as a current device rather than a voltage device.

An object of this invention is the provision of a completely solid state controller of relatively small size, economy of manufacture, high sensitivity and high accuracy.

An object of this invention is the provision of control apparatus responsive to changes in an input signal from a preselected level, which apparatus utilizes saturable core reactors as the balancing elements and includes means automatically compensating for temperature changes effective upon the reactors and associated wire elements.

An object of this invention is the provision of a controller wherein a D.C. biasing current is caused to flow through a first set of saturable core reactor windings, the magnitude of such biasing current being adjustable in accordance with the set point of the controller; a D.C. control current is caused to flow through a second set of reactor windings, the magnitude of the control current varying with the changes in the condition under control; signal voltage pulses are applied to a third set of reactor windings; and a control member is actuated in accordance with the difference in the ampere-turns of the first and second set of windings thereby to effect a corresponding change in the condition under control.

An object of this invention is the provision of an on-off temperature controller utilizing a thermocouple as the temperature-sensing element and saturable core reactors as the system-balancing elements, said controller including means automatically compensating for temperature changes in the cold end of the thermocouple and for temperature changes of the reactors and associated wire elements.

An object of this invention is the provision of a temperature controller comprising a pair of saturable core reactors each having a plurality of windings, means applying to a first set of reactor windings energizing signal pulses having steep wave fronts, means applying to a second set of reactor windings a D.C. biasing voltage of predetermined magnitude, means applying to a third set of reactor windings a D.C. potential which varies in accordance with changes in the temperature of a medium, and control means effective to change the temperature of the medium, said control means being in the off condition when the ampere-turns of the second set of reactor windings is counteracted by the same number of ampere turns of the third set of reactor windings.

An object of this invention is the provision of an on-off temperature controller comprising a pair of saturable core reactors each having a plurality of windings thereon, means applying to a first set of reactor windings energizing signals having steep wave fronts, means for causing a D.C. biasing current to flow through a second set of reactor windings, the magnitude of said biasing current being manually adjustable in correspondence with the temperature set point of the controller, a thermocouple connected to a third set of reactor windings, means developing output voltage pulses having a height and width which varies with the difference in the ampere turns of the said second and third sets of reactor windings, and a control relay responsive to the said output voltage pulses to effect a change in the thermocouple temperature in a sense to maintain a balance between the thermocouple temperature and the controller set point.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims which are appended hereto.

In the drawings wherein like reference characters denote like parts in the several views.

Figure 1:
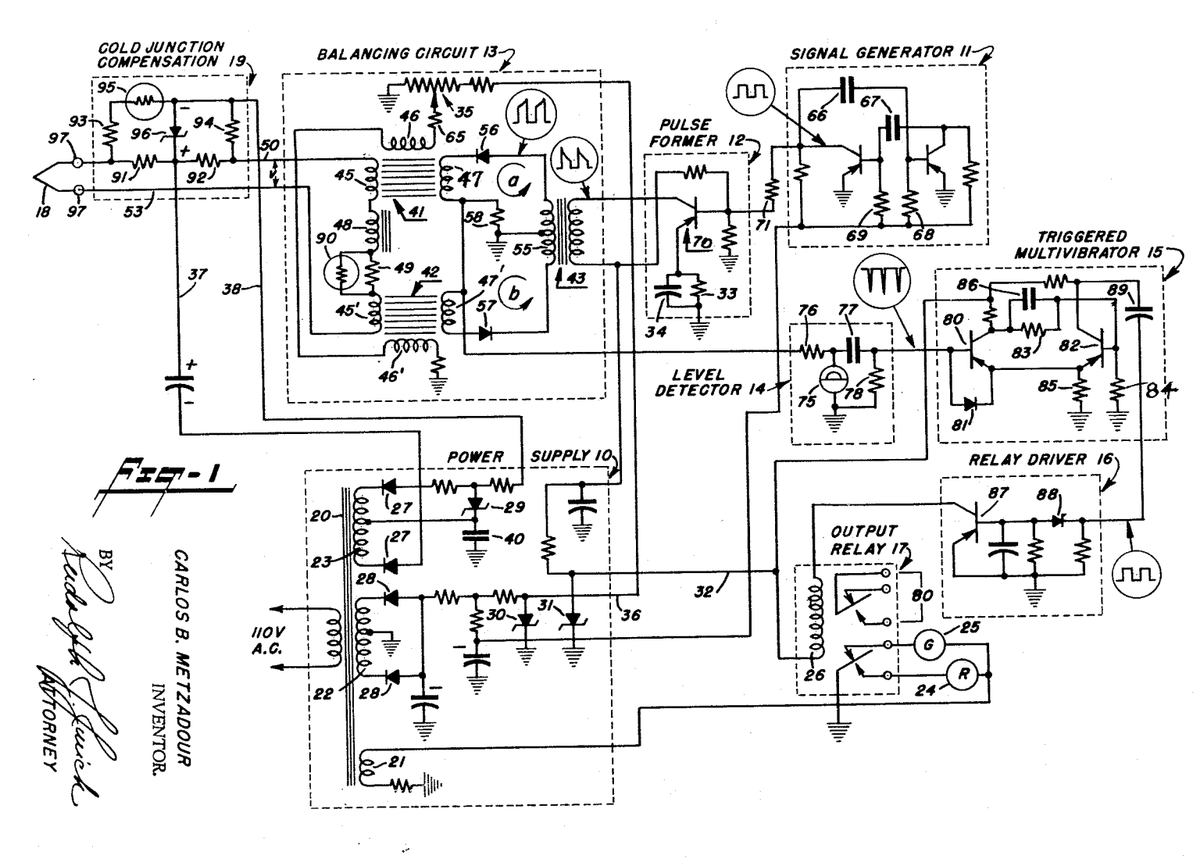
FIGURE 1 is a schematic, circuit diagram of a controller made in accordance with this invention.

Reference, now, is made to FIGURE 1 wherein the main components of the novel control apparatus are shown enclosed within dotted lines, namely, a power supply 10, a signal generator 11, a pulse former 12, a balancing circuit 13, a voltage level detector 14, a trigger circuit 15, a relay driver 16 and an output relay 17. The thermocouple 18 is connected to the balancing circuit through a cold junction compensation circuit 19.

The power supply 10 includes a transformer 20 having a primary winding connectable to a conventional 110 volt A.C. power line, a secondary winding 21 and two, center-tapped secondary windings 22 and 23. The secondary winding 21 provides 6.3 volts for energization of the signal lamps 24, 25, the green lamp 25 being energized when the output relay 17 is in the normal, de-energized condition and the red lamp 24 being energized when the relay is energized. It will be noted that the output relay includes two movable contacts, each associated with a normally closed back contact and a normally open front contact. The upper contact set is connectable to an electric power circuit for the on-off control of electrical energy supplied to a furnace in accordance with energization and deenergization of the relay operating coil 26.

The two, center-tapped secondary windings 22 and 23 provide two isolated sources of voltage for the various circuits of the controller, such voltages being fully rectified by the associated rectifiers 27 and 28 and stabilized by the Zener diodes 29, 30 and 31. The Zener diode 31, which is a type 1N1605, stabilizes the D.C. voltage appearing across the lead 32 and ground at about 12 volts, which voltage is utilized to energize the output relay 17, the trigger circuit 15, and the signal generator 11 and the pulse former 12, the latter two circuits including a decoupling resistor 33 and capacitor 34 to avoid feedback through the power supply. Actually, the pulse shaper operates on 5 volts D.C. to secure core saturation. A regulated negative (—) D.C. voltage is applied to a biasing potentiometer 35 by the lead 36, such voltage being fed through a second stage of stabilization consisting of the Zener diode 30 (which is a type 1N470) thereby avoiding the influence of line variations upon the output of the potentiometer. This is important, as the setting of the potentiometer 35 determines the balance point of the balancing circuit 13, as will be described in detail hereinbelow.

The rectified voltage of the center-tapped secondary coil 23 is applied, by means of the leads 37 and 38, to the cold junction compensation circuit 19. The voltage applied to this compensation circuit is stabilized by the type 1N470 Zener diode 96 (in the power supply) and the type 1N466 Zener diode 39 (in the compensation circuit), thereby eliminating the effects of line voltage variations. Further, this compensation circuit is not grounded and hum pick-up is avoided by use of the capacitor 40 connected between the center tap of the power winding 23 and ground.

The balancing circuit 13, comprises the identical saturable core reactors 41, 42 and the coupling transformer 43. These saturable core reactors are driven by the current flowing through the thermocouple and, therefore, in order to attain a desired, high sensitivity, the core material should have a very high permeability (such as "Supermalloy") having a permeability of 300,000 to 900,000. Each reactor carries three coils, specifically, coils 45, 45' and 46, 46' and 47, 47'. The coils 45, 45', which may be termed control coils, are connected in a series circuit which includes the inductor 48, a compensating resistor 49, the lead 50, compensating resistors 91, 92, the thermocouple 18 and the lead 53. It may here be pointed out that the thermocouple is located at a point remote from the controller and the resistance of the leads by which the thermocouple is connected to the controller must be considered as a factor in the circuit design. The coils 46, 46', termed the biasing coils, are connected in series between ground and the slider of the potentiometer 35 whereby the magnitude of the current flowing through these coils is directly related to the setting of the slider. The coils 47, 47', termed the energizing coils, are connected in series across the center-tapped secondary winding 55 of the coupling transformer 43, through the reversely-disposed rectifiers 56, 57, with the common junction of the coils connected to the center tap through an output resistor 58.

Before proceeding with the description of the circuitry, the operation of the balancing circuit 13 will now be described. It is well known what the electromotive force, $e$ induced across the terminals of an inductor is given by the equation, $$e = -N \frac{d\Phi}{dt} \qquad (1)$$

where:

N is the number of coil turns,
$\Phi$ is the magnetic flux across a section of the core, and
$t$ is time.

Also, $$\Phi = \int B dA \qquad (2)$$

where:

B is the induction vector, and
$dA$ is the elementary area of the core.

If the magnetic material has a linear permeability, ($\mu$=constant), B would simple be $\mu$H, where H is the magnetic field strength in gausses. However, in a ferromagnetic material, $\mu$ is not constant and there is a definite relationship between the magnetic field H and the induction vector B, which relationship is expressed by the well known hysteresis or B×H curve for the particular material.

There is a relationship between the magnetic field strength, H, and the current flow in the inductor since, $$\oint H ds = \int i dA \qquad (3)$$

where:

$i$ is the current density,
$s$ is any closed line around the conductor, and
$\int i dA = NI \qquad (4)$ Considering the magnetic field uniform in magnitude along a field line, $$\oint H ds = Hl \qquad (5)$$

where $l$ is the length of the magnetic circuit.

From Equations 3, 4 and 5, it follows that $$Hl = NI \text{ and } H = \frac{NI}{l} \qquad (6)$$

If we consider the induction vector uniform across an elementary section of the core, $$\Phi = BA$$

where A is the area under consideration.

Figure 2:
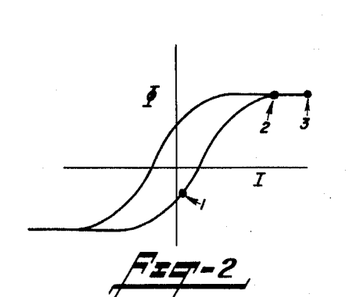
FIGURE 2 is a graph showing the relationship between the current flowing in an inductor and the magnetic flux developed in the associated core.

Thus, a graph showing the relationship between Φ and I can be drawn as shown in FIGURE 2. Since the voltage, e, induced across the inductor is, $$e = -N\frac{d\Phi}{dt}$$

e will be zero when Φ reaches a constant value.

Figure 3:
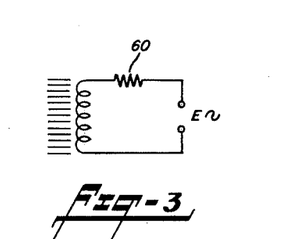
FIGURE 3 is a circuit diagram showing an inductor having a voltage applied thereto through a series resistor.
Figure 4:
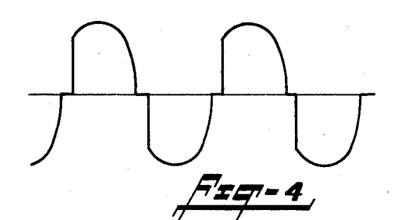
FIGURE 4 is a graph showing the wave form of the voltage across the resistor shown in FIGURE 3 when the applied voltage is sinusoidal.

If we now assume a circuit like that shown in FIGURE 3, and the current I flowing through the inductor, has a magnitude at all times below the saturation point of Φ, the voltage induced across the inductor, e, will neutralize the applied voltage E and the voltage across the resistor 60 will practically be zero. However, when the magnitude of the current, I, is such that the inductor reaches the saturation point, there will no further increase in the induced voltage. In consequence, a current will flow through the resistor 60 in accordance with Ohm's law. If the applied voltage, E, is sinusoidal, the current through the resistor 60, and the voltage across it, will have a waveform as shown in FIGURE 4. By inserting a rectifier 61 between the inductor winding and the applied voltage, E (see FIGURE 6), the waveform appears as in FIGURE 5, it being assumed that means are provided to demagnetize the core between cycles.

Figure 5:
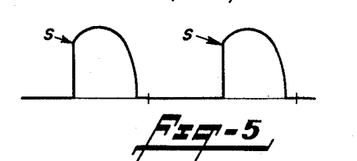
FIGURE 5 is a similar graph showing the wave form when a rectifier is inserted in series with the inductor.
Figure 6:
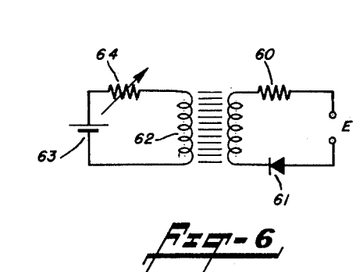
FIGURE 6 shows a multi-winding reactor having a main winding energized by an A.C. voltage and an auxiliary winding energized by a D.C. voltage.

The vertical front of the waveform will appear at the instant when the inductor reaches the saturation point. The sharper the transition in the ferromagnetic material curve, the sharper will be the wavefront. The relative position of the sharp wavefront depends upon the point where the magnitude of the current, I, produces core saturation. Such point can be changed by a D.C. current flowing in the primary inductor winding or in an auxiliary winding, as shown specifically in FIGURE 6, wherein the auxiliary winding 62 is shown connected to a battery 63 through an adjustable resistor 64. For purposes of description, the multi-winding inductor, as shown in FIGURE 6, will be called a reactor. If the reactor is operated between points 1 and 2, as shown in FIGURE 2, the core is not saturated and there would be practically no voltage across the resistor 60. However, if the reactor is operated between points 2 and 3, there would be no induced voltage and the current flow through the resistor 60 would be a maximum. Thus, when the magnitude of the applied sinusoidal voltage, E, is maintained constant, the magnitude of the voltage across the resistor 60 can be zero throughout a complete cycle of the applied voltage, or can be a half sinusoid, depending upon the core magnetizing force as determined by the circuit constants. When the magnitude of the applied voltage is such as to produce core saturation at some point during each half cycle, the waveform of the voltage across the resistor 60 appears as shown in FIGURE 5, the points s corresponding to the points at which the core becomes saturated. Since the core-saturation point can be changed by varying the magnitude of the D.C. current flowing in the auxiliary winding 62, the position of the sharp wavefront (points s) can be varied accordingly. This property of a saturable core reactor is utilized to advantage for the formation of control pulses in the controller.

Figure 7:
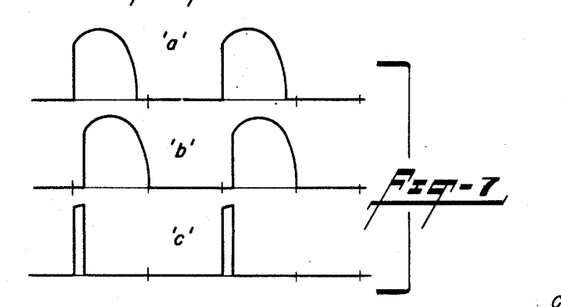
FIGURE 7 is a set of curves showing the wave form of the currents flowing in the balancing circuit of the controller under certain conditions.

Referring, again, to FIGURE 1, the balancing circuit 13 comprises, essentially, the two, multi-winding, saturable core reactors 41 and 42. The circuit appears to be symmetrical, but it will be noted that the diode rectifiers 56 and 57 are connected in the circuit of the energizing coils 47, 47' in such a way that current can flow only in one direction, namely, counterclockwise, as indicated by the arrows. Thus, the current flowing through the output resistor 58 is the difference between the current flowing in the loops marked a and b. Assuming that the current flowing in loop a has a sharp, vertical wave front an instant before that of the current flowing in loop b, as shown by the corresponding curves a and b in FIGURE 7, the current through the resistor 58 will be a sharp pulse, as shown in curve c (FIGURE 7), said curve c being the difference between curves a and b. Obviously, if the wavefront of the current flowing in loop b occurs an instant before that of the current flowing in loop a, the waveform of the current flowing in the resistor 58 will be similar to that shown by the curve c but of reversed polarity. The current flowing through the biasing windings 46, 46' controls the position of the sharp wave fronts. With the biasing windings 46, 46' wound on their respective cores in the same sense, and with the energizing windings 47, 47' wound in opposed sense, the D.C. biasing current shifts the wavefronts in opposite directions and controls the width, height and polarity of the resulting wave pulse through the resistor 58. The height of such wave pulse will vary because the wavefronts of the current flowing in the reactor energizing windings are steep but not absolutely vertical. A balanced condition of the balancing circuit 13 prevails when both such wavefronts coincide, in time, whereby the voltage across the output of the resistor 58 is zero. Thus, for a small change in the D.C. biasing current, a very thin, steep pulse will appear across the resistor 58, the polarity of such pulse corresponding to the sense of the change of the biasing current relative to the balance point of the circuit. It will be noted that the magnitude of which is determined by the setting of the the setting of the potentiometer 35, which potentiometer is connected to a constant D.C. voltage developed by the power supply 10, specifically, the secondary winding 22.

Actually, the D.C. biasing ampere-turns effective to shift the saturation point of the reactors 41 and 42 are composed of two components, namely, ampere-turns due to the biasing current flowing in the biasing coils 46, 46' (the magnitude of which is determined by the setting of the potentiometer 35) and the ampere-turns due to the reverse current flowing in the control windings 45, 45' (the magnitude of which is determined by the voltage generated by the thermocouple). When the D.C. current flowing through the biasing windings 46, 46' is relatively large, a relatively large D.C. current flow is required in the control windings 45, 45 to establish ampere-turn equality so that the wavefronts of the currents flowing in loops a and b exactly coincide in point of time to produce a zero voltage across the resistor 58. Conversely, the lower the magnitude of the current flowing in the biasing windings, the lower must become the magnitude of the current in the control windings to achieve the same result. It will be apparent, therefore, that the set point of the controller corresponds to the setting of the potentiometer 35 and that the potentiometer movable arm can be mechanically coupled to an indicator which cooperates with a scale calibrated directly in values of temperature. It will be apparent that the magnitudes of the D.C. currents flowing in the biasing and the control windings need not be equal to produce a balanced condition of the balancing circuit as one winding may have more or less turns than the other.

The inductor 48, which is operated at all times well below saturation, permits the flow of D.C. current through the control windings 45, 45' and, at the same time, isolates the reactors so that they are not linked during that part of the operating cycle in which the cores are not saturated.

Since, $$H = \frac{N}{l}i$$

the larger the value of H, for a given current density (i), the smaller must be the length (l) of the magnetic circuit and the larger must be the number of winding turns (N) on the reactors. This requires small cores with as many winding turns as possible thereon. On the other hand, since the thermocouple is a voltage source, the use of very thin wire for the control windings 45, 45' results in a high circuit resistance with a reduction in overall sensitivity. A good compromise has been found by making each of the biasing coils of 600 turns of No. 34 wire wound upon a supermalloy core having a thickness of 0.125″, an outside diameter of 0.625″ and a hole diameter of 0.5″. The biasing windings 46, 46' are not as critical since the current flowing therethrough is provided by the power supply. 100 turns of No. 34 wire has been found satisfactory for each of these windings, with the load resistor 65 connected in series therewith to avoid loading the reactors at the moment when they are not saturated. As concerns the signal, or energizing, windings 47, 47′, the number of turns depends primarily upon the frequency of the energizing signal developed in the coupling transformer 43. It is preferable to keep the resistance of the coils 47, 47′ relatively low in order to obtain a higher output voltage across the output resistor 58. On the other hand, a higher number of turns will permit the use of a higher signal voltage level offering a correspondingly higher output. Here again, a compromise results in the making of the energizing coils 47, 47′ each of No. 34 wire, 150 turns, when a signal of about 600 cycles per second is used. The output resistor 58 may have an ohmic value of 27 ohms, thereby providing a fairly low output impedance which is convenient for the following stages of the apparatus.

Instead of applying a sinusoidal signal to the saturable reactors, I prefer to apply transient pulses. In order to obtain reasonably steep and high level pulses, the applied signal should be strong enough to effect saturation of the reactor cores in a short time period which requires a considerable amount of power. Energizing the reactors directly from an A.C. line has been found inconvenient, due to the difficulty of adequate regulation and the increased wire size required for the reactors, and particularly the isolating inductor 48, at low frequencies. I prefer to use a signal frequency of the order of 600 cycles per second. Normally, a sinusoidal oscillator of this frequency requires a fairly high amount of power, necessitating the use of power transistors which are susceptible to drifting with temperature changes.

I, therefore, prefer to use a signal generator 11 (see FIGURE 1) which is a free-running, multi-vibrator generating square waves having an amplitude determined by the voltage source Zener diode 31 and a frequency fixed by the time constants of the coupling capacitors 66, 67 and resistors 68, 69. With the applied voltage stabilized by the Zener diode 31, of the power supply, square waves having a frequency of 600 cycles and a constant amplitude of about 12 volts are applied to the base of the pulse-forming transistor 70 through the current-limiting resistor 71. This transistor, having the primary winding of the coupling transformer 43 connected in its collector circuit, is energized at a relatively low voltage so that it is readily saturated, or almost cut off by the driving signal. Although the transistor current swings from saturation to a very low value, it does not actually reach the cut off point, the lower value of such current being determined by the value of the resistor 33. A capacitor 34 reduces feedback and also contributes to the shaping of the signal pulses.

Figure 8:
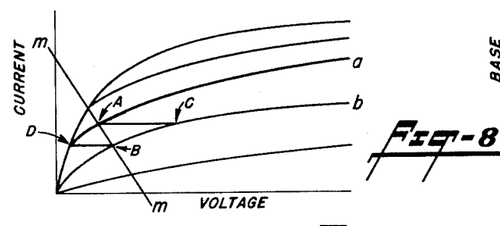
FIGURE 8 are characteristic current-voltage curves of a transistor.

Reference, now, is made to FIGURE 8, which is a family of current-voltage curves for a transistor, such as the type 2N217 used in the pulse former circuit. Let us assume that the time interval between two consecutive changes in the driving current is relatively long compared to the time constant of all other elements, that is, the circuit elements have time to reach a steady state condition between changes in the driving signal. It will also be assumed that the D.C. load for the transistor is the straight line $m, m$, that the emitter is directly connected to ground, and that the driving current jumps from point $a$, to $b$, to $a$, for one cycle of the square wave applied to the base of the transistor.

Figure 9:
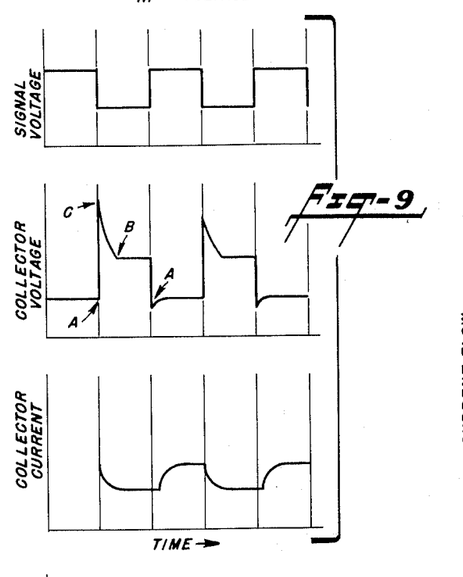
FIGURE 9 is a set of curves showing the square wave signal applied to the input circuit of the pulse-forming transistor and the wave forms of the resulting output current and voltage.
Figure 10A:
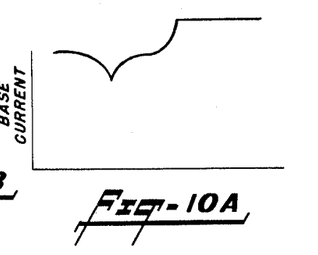
FIGURES 10A and 10B are curves showing expanded portions of the base current and collector voltage pulses of the pulse-forming transistor.
Figure 10B:
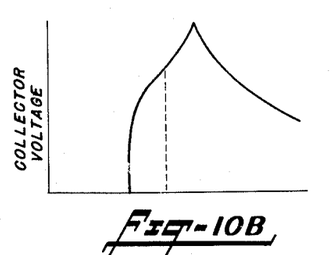

Beginning with the point A, the operating point at a steady state condition, let us suppose the base current changes abruptly from the curve $a$ to curve $b$. Normally, with only resistive load, this would merely change the operating point to the point B. However, the inductance of the coupling transformer 43, having a primary winding connected in the collector circuit of the transistor, does not permit an instantaneous change in current but, rather, produces an instantaneous voltage which momentarily changes the operating point to the point C. From this moment on, the operating point will move, following an exponential law, along the line $b$ until the operating point B is reached. The point of work is now B and will remain so until the driving base current jumps from $b$ to $a$. Again, the inductor will cause a horizontal excursion to the point D and along the line $a$ to the original starting point A. FIGURE 9 ilustrates the collector voltage and collector current curves related to the square wave voltage signals applied to the transistor base. The sharp, high voltage pulse, between the points A and C is utilized to drive the reactors of the balancing circuit 13. The character of the transistor makes such voltage pulse useful for this purpose. Intrinsically, the transistor base is a non-linear impedance. This fact, together with the time required for the movement of the electron charges within the transistor, and the presence of the emitter capacitor 34 (FIGURE 1) result in a base current wave form which changes instantaneously and then describes a curved line as shown in FIGURE 10A and the collector voltage rises accordingly, as shown in FIGURE 10B, both figures showing only the first instant of the signal pulse, greatly expanded. When the reactors 41 and 42, (FIGURE 1) saturate, the voltage across the transformer drops along the dotted line shown in FIGURE 10B.

Figure 11A:
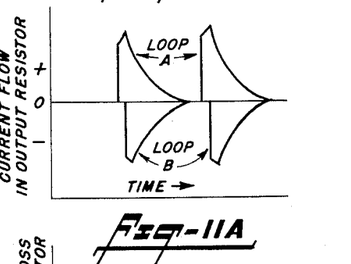
FIGURE 11A are curves showing the waveforms of the two currents flowing in the output resistor of the balancing circuit.
Figure 11B:
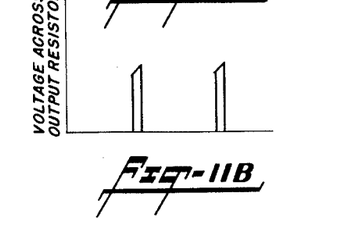
FIGURE 11B shows the resultant voltage pulse developed across the output resistor.

The sharp voltage pulses applied to the coupling transformer 43, FIGURE 1, result in correspondingly-shaped current pulses flowing in reactor loops $a$ and $b$. Such current pulses, shown in FIGURE 11A, flow in opposite directions through the output reactor 58 and when the wavefront of these pulses occur at the same instant, the voltage across the output resistor 58 will be zero and the balancing circuit is in a balanced condition. A shifting of the wavefronts, in one or the other direction relative to each other, results in voltage pulses appearing across the output resistor, as shown in FIGURE 11B. Such shifting of the wavefronts depends upon the level of the D.C. current flowing in the biasing windings 46, 46′ and the control windings 45, 45′, the magnitude of the former determined by the setting of the potentiometer 35 and the magnitude of the latter depending upon the temperature difference between the hot and cold ends of the thermocouple 18. Thus, when the saturation level of the cores of the reactors 41 and 42 is the same, the current pulses in the loops $a$ and $b$ will coincide, in time, resulting in no current flow through the resistor 58 and no voltage thereacross. A shifting of the core saturation levels, that is, an increase in the level of one core and a corresponding decrease in the level of the other core, occurs upon a change ni the magnitude of the current flow in the thermocouple circuit brought about by an increase or decrease in the temperature effective at the hot end of the thermocouple. Specifically, when the thermocouple temperature decreases, a steep voltage pulse of one polarity appears across the output resistor 58 and when the thermocouple temperature increases, a similar pulse of opposite polarity appears across the resistor. Reversing the direction of the current flow through the control windings 45, 45′ merely reverses the relative polarities of the resulting voltage pulses developed across the output resistor. The height and width of the voltage pulses developed across the output resistor (when the balancing circuit 13 is unbalanced) will vary in correspondence with the extent to which the saturation levels of the two reactors are shifted which, in turn, depends upon the extent of the change in the magnitude of the D.C. current flowing in the thermocouple circuit.

The voltage pulses appearing across the output resistor 58, upon circuit unbalance, are utilized to control the actuation of the power relay 17 for the on-off control of the electrical energy supplied to the furnace, or other medium, the temperature of which is sensed by the thermocouple. In operation, when the temperature at the thermocouple corresponds to the preset level, as established by a setting of the potentiometer 35, the voltage across the output resistor is zero and output relay 17 is deenergized whereby the upper set of relay contacts 80 opens the circuit between the furnace and the source of electrical power. When the temperature at the thermocouple exceeds the preset level, the voltage pulses developed across the output resistor are of a polarity such that they do not effect energization of the power relay. However, when the temperature at the thermocouple is below the preset level, voltage pulses of a reverse polarity appear across the output resistor and such pulses effect an energization of the power relay thereby closing the electrical power circuit and supplying energy to the furnace. It is desirable to establish a fixed finite point of reference which will determine the on or off condition of the controller. Such reference point (which corresponds to a balanced condition of a conventional bridge type controller or to a zero error voltage in a potentiometric type controller) could be the instant when the two saturable core reactors produce equal current flow in their respective loops $a$ and $b$. However, due to the lack of absolute equality between the two reactors and the effects of transients in the switching process, it is desirable to establish a reference point at a voltage level other than zero across the output resistor 58. This is accomplished by means of the level detector 14, consisting of a tunnel diode 75 connected across the output resistor 58 through the load resistor 76 and which is shunted by a capacitor 77 and resistor 78.

Figure 12:
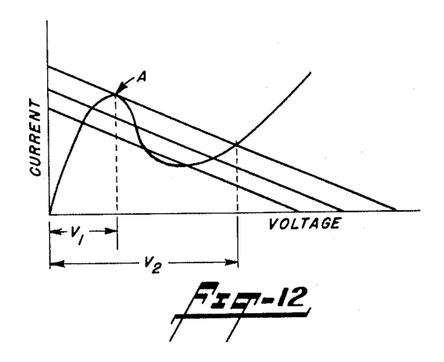
FIGURE 12 shows characteristic curves of a tunnel diode.

The tunnel diode 75, which is almost completely independent of temperature changes, has a characteristic curve such as that shown in FIGURE 12. The straight, solid lines represent the load resistance. When an input voltage pulse is applied to the diode, the output voltage pulse increases in correspondence with the input pulse until the peak point A is reached, after which a negative resistance effect occurs, causing the output voltage pulse to increase suddenly from $v_1$ to $v_2$. This jump in the output voltage pulse is of a magnitude of about 500 millivolts and is utilized to operate the triggered multivibrator 15. Inasmuch as the starting point of the multivibrator may change slightly, due to a temperature drift in the transistors, the tunnel diode has the advantage that the relatively high jump in output voltage eliminates the effect of any possible variation in the normal starting point of the multivibrator. It is only necessary that the triggering point of the multivibrator fall somewhere between, say, 50 and 500 millivolts. In this way, there will be no point of indecision with respect to operation of the power relay.

The load resistance of the tunnel diode is an important consideration in the design of the circuit. If the load resistance is lower in value than the negative resistance of the diode, there will be no jumping of the diode output voltage, that is, the output will vary continuously with the input. It is here pointed out that the emitter resistance of the driver transistor 70 has an influence in determining the load requirements of the diode to provide the desired jump action. For a Hoffman tunnel diode type HT7, it has been determined that a suitable value for the load resistor 76 is 560 ohms.

The mono-stable triggered multivibrator, which is a modified Schmidt trigger circuit, is employed to generate a signal having a high energy content each time a pulse is delivered thereto by the tunnel diode. The diode 81 is forwardly biased so that a voltage drop of about 300 millivolts appears across the base-emitter of the transistor 80 which retains the transistor in a non-conducting, or off, condition. At the same time, transistor 82 is in the conducting, or on, condition, due to the bias established by the voltage divider comprising the resistors 83 and 84. It is important to note that the incoming negative voltage pulse (from the tunnel diode) must overcome the 300 millivolt threshold voltage in order to drive the transistor 80 into conduction. Conduction of transistor 80 produces an amplified signal which cuts off conduction of transistor 82. This lowers the voltage drop across the emitter resistor 85 which helps the transistor 80 to continue conducting. This state continues until the coupling capacitor 86 is discharged to the point where transistor 82 conducts again. At this time, the potential across the emitter resistor 85 increases, thereby cutting off transistor 80 until another suitable voltage pulse starts the cycle again.

The square wave signal from the multivibrator 15 is rectified and smoothed and is used to drive the transistor 87 which has the energizing winding 26, of the power relay, connected in the collector circuit. The signal is coupled to the rectifier 88 through an electrolytic capacitor 89 to avoid interference between stages. When the multivibrator delivers an output signal, the power relay is energized thereby delivering power to the furnace. In the absence of such output signal, due either to the balanced condition of the balancing circuit 13 or to the failure of a circuit component, the relay is deenergized and power to the furnace is cut off. Since a negative voltage pulse exceeding 300 millivolts, must be supplied by the tunnel diode in order to trigger the multivibrator 15, it will be clear that the circuit is arranged so that such negative voltage pulses appear only when the thermocouple temperature is below the preset level, as determined by the setting of the potentiometer 35.

In order to provide a controller of high accuracy, it is necessary to provide means compensating for the effects of temperature changes, particularly changes in the ohmic resistance of the reactor windings and changes in the cold junction temperature of the thermocouple.

Changes in the ohmic resistance of the reactor windings are compensated for by a thermistor 90 connected in parallel with the manganin resistor 49. Knowing the resistance of the copper windings and the resistance ratio of the particular thermistor for a selected temperature span, the value of the resistor 49 can be computed to provide a maximum circuit resistance deviation of 0.5% over the selected temperature span.

Generally, the controller is located in a position remote from the thermocouple and the thermocouple leads are of the same wires as the particular thermocouple. In such case, the cold junction of the thermocouple is at the controller connection terminals. The voltage generated by the thermocouple varies with the difference in temperature between the hot and cold junctions. Consequently, in order to use a thermocouple for measurement or control purposes it is necessary either to maintain the cold junction at a known, constant temperature or to provide means which automatically compensates for cold junction temperature changes to either side of a mean temperature for which the apparatus is calibrated. Arrangements for maintaining the cold junction temperature at a known constant value are complex and costly.

In the present instance, the cold junction compensation is accomplished by a bridge circuit which comprises the four manganin resistors 91, 92, 93, 94, a thermistor 95 and a Zener diode 96. The resistors 91 and 92 have a very low resistance, of the order of tenths of an ohm, to avoid increasing the resistance of the circuit. The power source for the bridge has been made independent of the general power source of the apparatus to avoid the grounding of any point in the thermocouple circuit. By such isolation, the thermocouple is not sensitive to possible contacts to ground. The two Zener diodes 29 and 96 provide a sufficient stabilization of the bridge-energizing potential to avoid the effects of line voltage changes. The compensating bridge is positioned as close as possible to the thermocouple connection terminals 97 so that these members are always subjected to the same ambient temperature. When the resistance of the thermistor 95 decreases the voltage drop across the bridge resistor 91 increases, which tends to neutralize the voltage drop across the resistor 92, the latter having an opposite sign. With a known thermocouple, the ohmic value of the bridge resistors 93, 94 and the bridge-energizing voltage can be calculated so that the resultant voltage drop across the bridge resistors 91 and 92 will be added to or subtracted from the generated thermocouple voltage, thereby maintaining a constant voltage, $V_1$ across the reactor control windings irrespective of temperature changes at the thermocouple cold junction. In actual practice, using an iron-constanan thermocouple, cold junction changes between 20° C. and 50° C. (68° F. to 122° F.), resulted in a minimum deviation of the voltage V corresponded to less than ¾° F. from the absolute voltage-temperature curve of the thermocouple.

In summary, then, the thermocouple generates a voltage in accordance with the temperature difference between the hot and cold junctions. Its response is almost a straight line. Since the resistance of the thermocouple circuit remains constant, the D.C. current flow in the control windings of the saturable core reactors will be proportional to the thermocouple temperature. To set the controller for operation at a given temperature, the potentiometer 35 is set to a position corresponding to the given temperature thereby causing a corresponding D.C. current to flow through the biasing windings of the reactor. Such D.C. current shifts, relative to each other, the leading edges of the resulting 600 cycle, sharp, wavefront pulses of the currents flowing in the energizing windings of the reactors. This results in a voltage pulse appearing across the output resistor 58, which pulse triggers the multivibrator and energizes the power relay, thereby applying energy to the furnace. As the temperature of the furnace increases, the increasing current flowing in the reactor control windings brings the two wavefronts toward coincidence. When the wavefronts are in precise coincidence, the power relay 17 is deenergized and the energy supply to the furnace terminated. In the event the furnace temperature overshoots the set point level, the reverse shift of the signal wavefronts produces voltage pulses of opposite sign across the output resistor but such pulses have no effect upon the multivibrator and, therefore, the power relay remains deenergized. As the furnace temperature decreases slightly below the set point level, the power relay will again become energized and close the power circuit to the furnace. Thus, the power relay operates at the set point level of the controller, at which point the amperes-turns of the biasing windings are counteracted by the same number of ampere turns in the control windings. The set-point potentiometer 35 has a relatively low resistance compared to that of the reactor biasing winding circuit whereby the potentiometer can be suitably calibrated relative to a cooperating scale graduated in actual temperature values for the particular thermocouple. With an iron-constantan thermocouple, a single potentiometer providing a continuous adjustment from 70° F. to 1500° F. can be used. However, in order to permit easier and less critical adjustment of the temperature set-point, the potentiometer may be split into three sections and suitable switches provided for the selection of a particular section. In this way, three temperature ranges may be made available, say, 70–500° F.; 500–1000° F.; and 1000–1500° F.

Inasmuch as the controller is a current-responsive device, the length of the connecting leads between the thermocouple and the controller must be taken into consideration. A variable resistor, connected in series with one of the input terminals 97, can be provided to adjust the circuit for leads of different lengths, such resistor having associated therewith a dial carrying a scale calibrated in feet.

Having given a detailed description of the invention, those skilled in this art will find no difficulty in making various changes and modifications to adapt the apparatus for use in specific applications. It is intended that changes and modifications of this character can be made without departing from the scope and spirit of the invention as set forth in the following claims.

I claim:

1. Control apparatus comprising,
   (a) a pair of saturable cores carrying series-connected sets of energizing, biasing and control windings,
   (b) means producing a flow of current pulses of constant sign through the set of series-connected energizing windings, the magnitude of such current pulses being at least sufficient to produce core saturation,
   (c) means producing a flow of a D.C. current of predetermined magnitude through the set of series-connected biasing windings, the magnitude of such current corresponding to a predetermined normal state of a condition to be controlled and the direction of such current flow through the individual biasing windings being such as to produce a time displacement of the leading edges of the current pulses flowing in the individual energizing windings,
   (d) means producing output voltage pulses having a height and width corresponding to the relative time displacement of the leading edges of the current pulses flowing in each of the energizing windings,
   (e) means providing a unidirectional signal which varies in correspondence with the actual state of the condition,
   (f) circuit elements applying the unidirectional signal across the series-connected control windings,
   (g) a control member, and
   (h) means effecting operation of the control member by the said output voltage pulses.

2. The invention as recited in claim 1, wherein the means effecting operation of the control member includes blocking means arranged to prevent operation of the control member when the magnitude of the said output voltage pulses is below a predetermined level.

3. The invention as recited in claim 1, including an inductor connected in series between the said control windings.

4. The invention as recited in claim 1, wherein the means producing a flow of current pulses through the energizing windings comprises a transformer having a primary winding energized by input voltage pulses, and a secondary winding connected across the said series connected energizing windings, and wherein the means producing the output voltage pulses is an output resistor connected between a center tap on the transformer secondary winding and the common junction of the said energizing windings.

5. The invention as recited in claim 4, wherein the said input voltage pulses have steep wavefronts.

6. The invention as recited in claim 4, wherein the means effecting operation of the control member comprises;
   a mono-stable multivibrator having a predetermined triggering voltage;
   a tunnel diode connected across said output resistor through a load resistor, the total effective resistance loading the diode being higher than the negative resistance of the diode thereby resulting in a sharply-increased diode output voltage when the current flow through the diode exceeds its peak point; and
   circuit elements connecting the tunnel diode to the multivibrator such that the sharply-increased diode output voltage triggers the multivibrator.

7. Control apparatus comprising,
   (a) a pair of saturable core reactors having series-connected energizing windings, biasing windings and control windings,
   (b) a transformer having a primary winding and a centertapped secondary winding,
   (c) an output resistor connected between the center tap of said transformer secondary winding and the common junction of the said energizing windings, (d) circuit elements including a pair of rectifiers connecting an end of each energizing winding to an end of said center-tapped secondary winding,
(e) a source of alternating energizing voltage,
(f) circuit elements applying the energizing voltage to the said transformer primary winding,
(g) a source of D.C. voltage,
(h) means applying a predetermined magnitude of the D.C. voltage across the said biasing windings, which magnitude corresponds to a predetermined state of a condition to be controlled,
(i) means producing a undirectional signal voltage which varies in magnitude in correspondence with the actual state of the condition,
(j) circuit element applying the said signal voltage across the said control windings,
(k) a control member having an operating coil, and
(l) means effecting energization of the said operating coil by the voltage appearing across the said output resistor.

8. The invention as recited in claim 7, including an inductor connected in series between the said control windings.

9. The invention as recited in claim 8, including means preventing energization of the said operating coil when the voltage appearing across the said output resistor is below a predetermined magnitude.

10. The invention as recited in claim 8, wherein the means effecting energization of the said operating coil comprises;
 a mono-stable multivibrator having a predetermined triggering voltage;
 a tunnel diode connected across the said output resistor through a load resistor, the total effective resistance loading the diode being higher than the negative resistance of the diode thereby resulting in a sharply-increased diode output voltage when the current flow through the diode exceeds the diode peak point; and
 circuit elements connecting the tunnel diode to the multivibrator such that the sharply-increased diode output voltage triggers the multivibrator.

11. The invention as recited in claim 8, including a first member having substantially zero temperature coefficient of resistance connected in series between the said control windings, and a second member having a negative temperature coefficient of resistance connected across the said first member, the ohmic resistance of the said members being so chosen with respect to that of the control windings so as to maintain a constant current flow through the control windings upon changes in the temperature of the reactors.

12. A temperature controller comprising,
(a) a pair of saturable core reactors having series-connected energizing windings, biasing windings and control windings,
(b) a transformer having a primary winding and a center-tapped secondary winding,
(c) an output resistor connected between the center tap of the transformer secondary winding and the common junction of the energizing windings,
(d) circuit elements including a pair of rectifiers connecting an end of each energizing winding to an end of the said center-tapped secondary winding,
(e) a source of alternating current energizing voltage,
(f) circuit elements applying the energizing voltage to the said transformer primary winding, the magnitude of the resultant current flowing in the said energizing windings exceeding that required to saturate the cores of the reactors,
(g) a source of fixed D.C. voltage,
(h) means applying a predetermined magnitude of the fixed D.C. voltage across the said biasing windings, which magnitude corresponds to the temperature set-point of the controller,
(i) a thermocouple connected to the said control windings,
(j) an output relay having an operating coil, and
(k) means effecting energization of the said operating coil by the voltage developed across the said output resistor.

13. The invention as recited in claim 12, including a reactor connected in series between the said control windings.

14. The invention as recited in claim 12, wherein the thermocouple is connected to the control windings through connection terminals constituting the cold junction of the thermocouple, and including temperature-sensitive compensating means connected between the said control windings and the said cold junction, said compensating means automatically compensating for changes in the voltage generated by the thermocouple upon deviations of the cold junction temperature from a predetermined value.

15. The invention as recited in claim 14, wherein the said compensating means comprises a four-arm resistor bridge, a member having a negative temperature coefficient of resistance connected in one bridge arm, a second source of D.C. voltage of predetermined magnitude, circuit elements connecting the said second source across the input diagonals of the bridge, and circuit elements connecting the output diagonals of the bridge in series between one of the said connection terminals and one of the said control windings.

16. The invention as recited in claim 14, including an inductor and a first member having a substantially zero temperature coefficient of resistance connected in series between the said control windings, and a second member having a negative temperature coefficient of resistance connected across said first member, the ohmic resistance of the said members being so chosen with respect to that of the control windings so as to maintain a constant current flow through the control windings upon changes in ambient temperature.

17. A temperature controller comprising,
(a) a pair of saturable core reactors each having energizing, biasing and control windings, corresponding windings of each reactor being connected in series,
(b) a transformer having a primary winding and a center-tapped secondary winding,
(c) a source of voltage pulses of constant polarity,
(d) circuit elements applying the said voltage pulses across the transformer primary winding,
(e) an output resistor connected between the center tap of the transformer secondary winding and the common junction of the reactor energizing windings,
(f) a pair of rectifiers respectively connected between an end of the transformer secondary winding and the end of the energizing winding, such that the current pulses flowing through the individual energizing windings flow through the said output resistor in opposite directions, the ampere-turns of each energizing winding producing magnetic saturation of the associated reactor core,
(g) means applying a D.C. voltage across the said biasing windings, the resulting current flow in one biasing winding magnetizing the core in the same direction as the current flow in the associated energizing winding and the current flow in the other biasing winding magnetizing the core in a direction reverse to that of the current flow in the associated energizing winding,
(h) means adjusting the magnitude of the current flow in the biasing windings in accordance with the temperature set-point of the controller,
(i) a thermocouple connected across the control windings, the ampere-turns of each control winding cancelling the core-magnetizing effect of the associated biasing winding when the thermocouple temperature equals the temperature set-point of the controller.

(j) a mono-stable multivibrator having a predetermined triggering voltage, (k) circuit elements appyling the output voltage pulses appearing across the said output resistor to the multivibrator so as to trigger the multivibrator when the magnitude of the said output voltage pulses exceeds the triggering voltage, (l) a control member having an operating coil, and (m) means energizing the said operating coil when the multivibrator is triggered.

18. The invention as recited in claim 17, wherein the means applying the said output voltage pulses to the multivibrator comprises, (n) a load resistor, (o) a tunnel diode connected across the said output resistor through the load resistor, the total effective resistance loading the diode being higher than the negative resistance of the diode thereby resulting in sharply-increased diode output voltage pulses when the current flow through the diode exceeds its peak point.

19. The invention as recited in claim 18, including, (p) an inductor and a first compensating resistor connected in series with the said reactor control windings, said resistor having a substantially zero temperature coefficient of resistance, (q) a first element having a negative temperature coefficient of resistance connected across the said first compensating resistor, the ohmic resistance values of the compensating resistor and element being chosen to maintain a constant current flow in the said control windings upon changes in ambient temperature, (r) a four-arm resistor bridge one arm of which includes a second element having a negative temperature coefficient of resistance, (s) a source of constant D.C. potential connected across the input diagonals of the bridge, (t) circuit elements connecting the output diagonals of the bridge between one lead of the thermocouple and one of the reactor control windings.

20. An improved balancing circuit for a controller of the type wherein an input signal is balanced against a set-point signal and a control member is actuated when the magnitude of the input signal exceeds that of the set-point signal, said improved balancing circuit comprising, (a) a pair of saturable core reactors having series-connected energizing windings, biasing windings and control windings, (b) means causing current pulses of constant sign to flow through the said energizing windings, the magnitude of such current pulses being at least sufficient to produce core saturation, (c) means causing a D.C. biasing current to flow through the said biasing windings, the magnitude of such current corresponding to the controller set point and the direction of the biasing current flow through one biasing winding magnetizing the core in the same direction as the current flow in the associated energizing winding and the direction of biasing current flow through the other biasing winding magnetizing the core in a direction reverse to that of the current flow through the associated energizing winding, thereby resulting in a relative time displacement of the leading edges of the current pulses flowing in the two energizing windings, (d) means applying the input signal across the said control windings, the resulting current flowing through each of the control windings magnetizing the associated cores in directions opposite to that of the associated biasing windings, and (e) means actuating the said control member when the leading edges of the current pulses flowing in the energizing windings are time-displaced relative to each other.

References Cited in the file of this patent

UNITED STATES PATENTS

| | | |
|---|---|---|
| 2,809,303 | Collins | Oct. 8, 1957 |
| 2,832,052 | Hearz | Apr. 22, 1958 |
| 2,931,971 | May | Apr. 5, 1950 |
| 3,075,127 | Secunde et al. | Jan. 22, 1963 |